Jan. 18, 1944.  C. R. TAYLOR  2,339,437
CONFECTION COATING APPARATUS
Original Filed Dec. 29, 1939  2 Sheets-Sheet 1
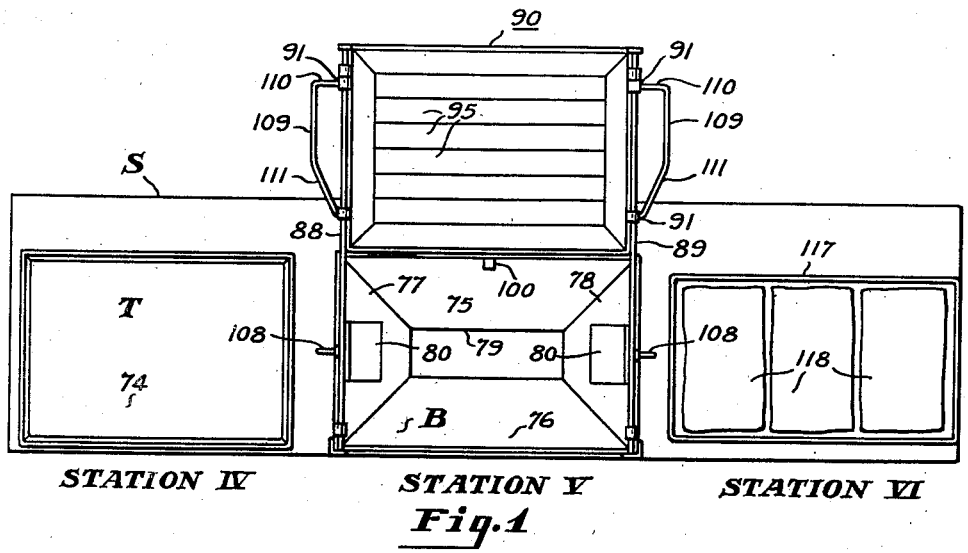
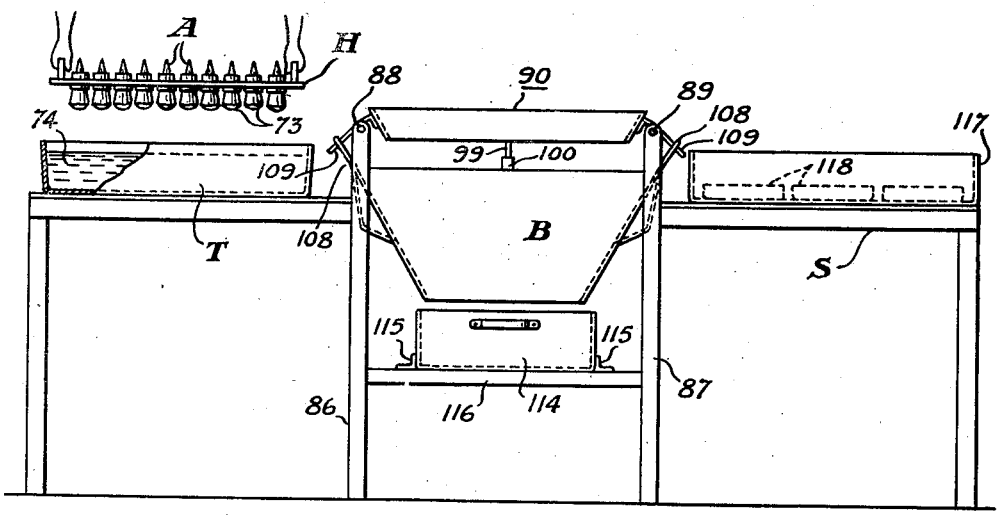
INVENTOR
Carl R. Taylor
BY
Evans + McCoy
ATTORNEYS Jan. 18, 1944.  C. R. TAYLOR  2,339,437
CONFECTION COATING APPARATUS
Original Filed Dec. 29, 1939  2 Sheets-Sheet 2
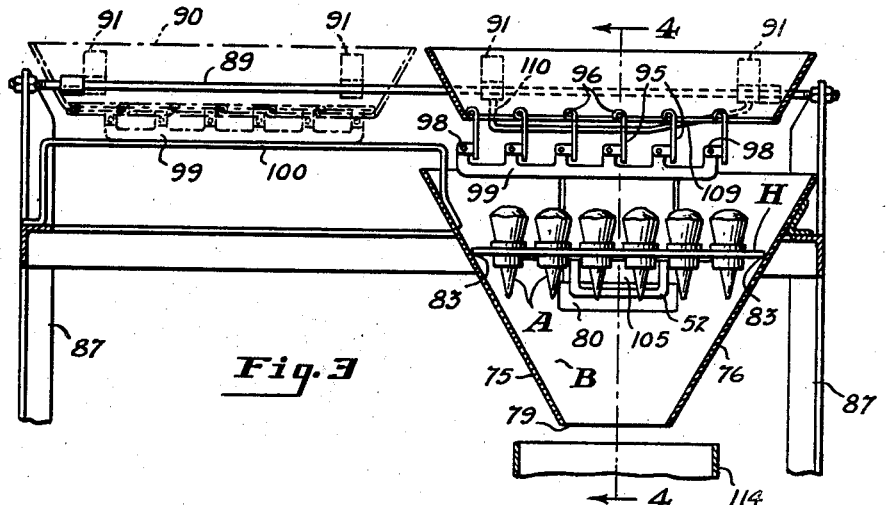
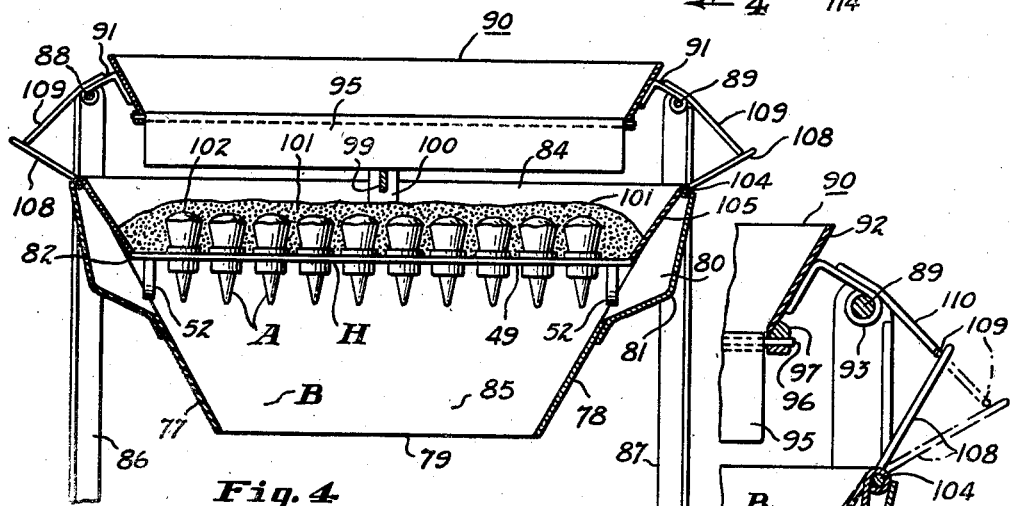
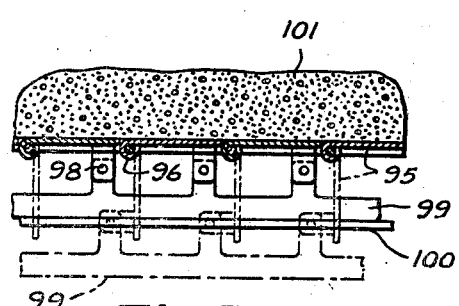
INVENTOR
Carl R. Taylor
BY Evans + McCoy
ATTORNEYS Patented Jan. 18, 1944

2,339,437

UNITED STATES PATENT OFFICE 2,339,437

CONFECTION COATING APPARATUS

Carl R. Taylor, Cleveland Heights, Ohio, assignor to The Cream Cone Machine Company, Cleveland, Ohio, a corporation of Ohio Original application December 29, 1939, Serial No. 311,555. Divided and this application April 15, 1942, Serial No. 439,055

12 Claims. (Cl. 107—1)

This invention relates to apparatus for making food articles such as frozen confections, and more particularly to such apparatus for producing chocolate nut coated frozen confections.

There are numerous machines available for making frozen confections and the like which operate on the principle of a continuous process. Such machines are of elaborate design and construction and consequently are very expensive. Makers of frozen confections who do not have a very large business cannot afford to invest in expensive machines for making their products. Furthermore, even large manufacturers of frozen confections do not wish to set up and operate large continuous process machines during slack business seasons because of the difficulty of cleaning and servicing such machines. However, to make a reasonable large number of frozen confections by hand is considered undesirable because of the increased labor cost. It is, therefore, an object of the present invention to provide apparatus for making frozen confections which may be economically operated on a large or small scale to produce confections in quantity with a minimum amount of labor.

Another object is to provide apparatus of the character mentioned which may be quickly and easily prepared for operation and which may be readily disassembled and cleaned so that it may be used to advantage for either relatively long or relatively short periods of time.

Another object is to provide apparatus for making frozen confection articles which minimizes the handling of the articles by the operator or operators so that the highest standards of cleanliness and sanitation may be maintained.

A further object of the invention is to provide apparatus for handling frozen confections and the like which accommodates a multiplicity of such confections at once. More specifically, it is an aim of the invention to provide apparatus which receives a plurality of confections for coating or covering thereof with comminuted food particles such as crushed nuts or cracker crumbs. In this connection it is to be observed that the unique article or confection handling device is devised to simultaneously hold a multiplicity of articles by their ends and in fixed relation with respect to one another for simultaneous coating thereof.

A still further object of the invention is to provide a generally improved apparatus for applying comminuted food particles to confections, which apparatus is of relatively simple design and construction and inexpensive to manufacture and which may be assembled, operated and disassembled with a minimum amount of relatively unskilled labor. Other objects and advantages inherent in the invention will become apparent as the following description of a suitable embodiment of the invention is made in connection with the accompanying drawings, in which, Figure 1 is a plan view of the apparatus showing the same set-up in readiness for the manufacture of confections;

Fig. 2 is a front elevational view of the apparatus;

Fig. 3 is a transverse vertical sectional view through the confection dusting or covering apparatus;

Fig. 4 is a sectional view with parts broken away, taken substantially on the line 4—4 of Fig. 3;

Fig. 5 is a fragmentary detail in section showing the pivoted wings for retaining the comminuted food particles on the holder carrying the confections, and the mechanism for moving the wings into operative position; and Fig. 6 is a fragmentary detail in section showing the construction of the dump bottom in the hopper or bin which carries the comminuted food particles to a position above the confections in the receptacle or trough of the dusting or covering device.

The apparatus of this invention may be used, for example, in making frozen confections according to the method disclosed in my co-pending application, Serial No. 311,555, filed December 29, 1939, now Patent 2,311,709, granted February 23, 1943, of which the present application is a division.

In carrying out this method, the frozen articles A may be any well known confections, such, for example, as ice cream cones each consisting of a conical shell formed of baked or fried dough and formed into the shape of a cone. Within the cone there is received a quantity of solidified confection such as ice cream. In the preliminary stages of the manufacturing process and not forming an essential part of the present invention, the cones are placed in carriers or baskets and then passed through a filling machine which deposits ice cream in a number of the cones in a single operation. The baskets or carriers, filled with the ice cream cones, are placed in a refrigerated compartment to freeze or solidify the ice cream and thereby prevent loss of the ice cream from the cone during subsequent steps of the process. One by one the baskets or carriers are withdrawn from the refrigerated compartment and the cones or articles A are transferred to a suitable holder H which is provided with sockets to receive the articles and means for retaining the articles in the sockets. In this manner the frozen articles or ice cream cones are locked in the holder and the latter can be picked up by the operator and inverted without the articles being released from the sockets. In the inverted position the holder H is positioned above a container or tank T at station IV and lowered so that large ends 73 of the articles or confections A are immersed in a bath or mixture 74 of congealable liquid contained in the tank T. The liquid 74 may be any desirable coating material, such, for example, as chocolate sauce or similar type of syrup. This liquid adheres to the articles and coats the ends 73 thereof. The composition of the liquid is such that it congeals or solidifies at low temperatures. The holder H is then turned over to position the articles A, now coated with the congealable liquid or syrup, in upright attitudes and the holder is placed in the hopper or bin B at station V.

The bin B is formed with imperforate side walls 75 and 76 and end walls 77 and 78, all of which converge or slope downwardly toward one another, providing a relatively small opening 79 at the bottom of the bin. The side and end walls may be formed of suitable material, such as sheet metal or laminated wood, and the end walls are cut away to provide recesses 80 having walls 81. These recesses accommodate the handles 52 of the holder so that the holder has contact with the side and end walls of the bin, as indicated at 82 and 83, in this manner separating the interior space within the bin into an upper portion 84 above the holder H and a lower portion 85 below the holder.

The receptacle B is carried by a portion of supporting structure S, having spaced uprights 86 and 87 at opposite ends of the receptacle. These uprights extend above the level of the tops of the receptacle walls and carry slide bars 88 and 89 in spaced parallel relation to one another. As shown in Fig. 3, the slide bars extend rearwardly beyond the receptacle B and provide support for a movable dump bottom hopper or bin 90. Extension brackets 91, preferably formed of metal, are secured to sloping side walls 92 of the bin 90 and extend laterally therefrom over the slide bars 88 and 89. End portions 93 of the extensions 91 embrace the slide bars to guide the movement of the bin.

A dump bottom is provided for the bin 90 and comprises a multiplicity of panels or slats 95 pivoted at their edges to spaced parallel rods 96 extending transversely across the bottom of the bin at right angles to the direction of reciprocation of the bin on the bars 88 and 89. The ends of the rods 96 may be rotatably received in journal members 97 secured along the bottom edges of the sloping side walls of the bin (Fig. 5).

The free ends of the slats 95 are provided with extensions pivoted at 98 to a common shoe 99 which is engageable with a track 100 carried by the supporting structure and the rear side wall 83 of the receptacle B. When the bin 90 is in the position illustrated by the broken lines of Fig. 3, the track 100 supports the shoe 99 in an elevated position which retains the shutters or panels 95 of the dump bottom in a common plane. Upon movement of the bin 90 to the right, as viewed in Fig. 3, the shoe 99 rides on the track 100 until the bin is positioned over the holder H and confections supported thereby in the receptacle B. When the shoe rides off the track 100, the support for the slats 95 of the dump bottom is released and the slats pivot downwardly to the spaced parallel position illustrated by the full lines, thus releasing comminuted particles, such as crushed nuts 101 (Fig. 6) previously placed in the bin 90 to fall by gravity over the articles A coated with the liquid 74.

A sufficient quantity of the nuts 101 is placed in the bin 90 before the latter is drawn to releasing or dumping position over the coated articles in the receptacle B, so that the upper ends of the articles above the holder H are entirely buried or embedded in the mass of released nuts or other comminuted food particles (see Fig. 4), where the broken line 102 indicates the approximate level of the nuts in the receptacle B after their release from the bin 90.

Pivoted at 104 to the tops of the receptacle ends are wings or closure doors 105 which normally hang downwardly into the recesses 80 in the end walls 77 and 78. The doors 105 are of such size that the lower edges 106 thereof clear the end edges of the holder H, as shown in Fig. 4, when the doors are pivoted inwardly toward one another. In this manner the doors 105 are arranged to close the openings from the upper chamber 84 into the recess 80, thus preventing nuts or other food particles 101 from escaping through the recess 80 into the lower chamber or compartment 85 of the receptacle.

Arms or extensions 108 secured to the wings or doors 105 and extending upwardly therefrom are disposed when the doors are in their lowered position in the path of a curved track or guide 109 secured by extension 110 to the extension brackets 91 which support the bin 90 on the slide bars 88 and 89. Accordingly, when the bin 90 is moved from its retracted position, shown by the broken lines of Fig. 3, to its advanced or dumping position, shown by the full lines of that figure, the arms 108 are engaged by the tracks or guides 109 so as to pivot the wings or doors 105 from the normal full line position illustrated in Fig. 5 to the broken line position of that figure. In this manner the apparatus for covering the coated confections with comminuted food particles includes mechanism for closing off the upper portions of the receptacle chamber from the lower portion thereof to prevent the escape of the comminuted food particles therefrom. Preferably, the leading end of each of the guides or tracks 109 is formed to converge or extend inwardly, as indicated at 111 of Fig. 1, so that a gradual swinging movement is imparted to the doors 105 as the bin is advanced to dumping position.

After sufficient time has elapsed for the congealable liquid 74 on the upper ends of the articles A to become solidified while the article ends are embedded or surrounded by the mass of comminuted food particles 101, the bin 90 is pushed by the operator away from its position over the receptacle B to approximately the retracted position shown by the broken lines in Fig. 3. This movement of the bin causes the guides 109 to release the doors or wings 105 and expose the handles 52 or ends of the holder H so that the latter may be grasped by the operator and inverted while above the receptacle B to release such of the comminuted particles or nuts as have not adhered to the coated articles. The released food particles or nuts are discharged through the narrow opening 79 in the bottom of the receptacle into a scoop or hopper 114 supported by the guides 115 on cross members 116 carried by the uprights 86 and 87. After the holder H has been inverted over the receptacle B to release the unattached comminuted food particles, the completed frozen confections or articles A are released by shifting the lever 69 to withdraw the pins 64 from the cones 1. Thereafter the cones are wrapped or packaged as desired and are ready for sale and consumption.

The comminuted food particles or nuts received by the hopper 114 are placed in the bin 90 while the latter is in the retracted or receiving position shown by the broken lines of Fig. 3 and the full lines of Fig. 1, the panels of slats 95 having been moved to closed position by the shoe 99 and track 100. Comminuted food particles in sufficient quantity to make up for that adhering to the previous batch or group of coated articles is then added to the mass thereof in the bin 90 and the coating apparatus is ready for the next batch of articles to be treated.

If desired, a cooler 117 may be provided adjacent the receptacle B at Station VI of the apparatus. This cooler can be mounted on the supporting structure S and comprises a tank or box suitably refrigerated by means of "dry ice" or solidified carbon dioxide 118. Instead of releasing the covered articles from the holder H immediately after being withdrawn from the receptacle B, the holder may be placed so that the edges thereof are supported on the side or end walls of the cooler box 117 with the coated and nut covered ends of the articles A extending downwardly into the interior of the box over the cooling means 118. In this manner the finished confections can be subjected to a cold atmosphere for a period of time after the nuts have been applied and before being packaged, so as to insure that the congealable liquid is thoroughly chilled before individual handling of the articles occurs. After the completed confections have been cooled in the refrigerator 117 they may be withdrawn therefrom as a group, secured in the holder H, and then released from the holder onto a table or receptacle in the packaging department of the establishment making the confections.

The principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim is:

1. In apparatus for coating confections, a holder for supporting a multiplicity of confections in upright spaced apart relation and constructed to provide a support for comminuted material in spaces surrounding the confections, a receptacle having closed side walls for receiving the holder and confections and including means for supporting the holder so that the confections are wholly below the top of the side walls, and said holder having marginal edges formed to contact the side walls of the receptacle around substantially the entire periphery of the holder to prevent comminuted food material on the holder from passing between the holder and the receptacle side walls, whereby the confections may be embedded in comminuted material delivered into said receptacle.

2. Confection making apparatus comprising a receptacle, a portable holder to mount a plurality of confections in side by side relation and adapted to support comminuted material in spaces surrounding said confections, said holder being receivable in the receptacle, means for supporting the holder in the receptacle, a hopper having a dump bottom, track means supporting the hopper for movement to and from a position above the supported holder, and means actuated by the movement of the hopper to said position to release the dump bottom thereof upon movement of the hopper to said position.

3. Confection making apparatus comprising a receptacle, a portable holder to mount a plurality of confections in side by side relation and adapted to support comminuted material in spaces surrounding said confections, said holder being receivable in the receptacle, means for supporting the holder in the receptacle, a hopper having a dump bottom, track means supporting the hopper for movement to and from a position above the supported holder, movable closures in the receptacle, and means actuated by movement of the hopper to said position for substantially simultaneously moving all of said closures into adjacence with the edges of the holder to thereby seal the space between said edges and the receptacle walls, whereby the confections may be embedded in comminuted material delivered into said receptacle.

4. Confection making apparatus comprising a receptacle, a portable holder to mount a plurality of confections in side by side relation and adapted to support comminuted material in spaces surrounding said confections, said holder being receivable in the receptacle, means for supporting the holder in the receptacle, a hopper having a dump bottom, track means supporting the hopper for movement to and from a position above the supported holder, movable closures in the receptacle, and means actuated by movement of the hopper to said position for substantially simultaneously moving all of said closures into adjacence with the edges of the holder to thereby seal the space between said edges and the receptacle walls and for releasing the dump bottom of the hopper to drop comminuted food particles contained in the latter onto mounted articles.

5. Confection making apparatus comprising a receptacle, a hopper having a dump bottom, track means supporting the hopper for movement to and from a releasing position over the receptacle, and means actuated by the movement of the hopper to release the dump bottom thereof upon movement of the hopper to said position.

6. In confection making apparatus, a receptacle, a hopper comprising side wall means and a plurality of pivotally mounted bottom forming slats, means mounting the hopper for movement to and from a releasing position over the receptacle, means interconnecting the slats for substantially simultaneous opening movement, and means automatically to actuate the slats in unison to close the hopper bottom upon movement of the latter away from said position and to open the hopper bottom upon movement of the hopper to said position.

7. In apparatus for coating confections, a holder for supporting a multiplicity of confections in upright spaced apart relation and constructed to provide a support for comminuted material in spaces surrounding the confections, a receptacle having closed side walls for receiving the holder and confections and including means for supporting the holder, and said holder having marginal edges formed to contact the side walls of the receptacle around substantially the entire periphery of the holder to prevent comminuted food material on the holder from passing between the holder and the receptacle side walls, whereby the confections may be embedded in comminuted material delivered into said receptacle.

8. Confection making apparatus comprising a receptacle, a portable holder having means for supporting a plurality of articles side by side and adapted to support comminuted material in spaces surrounding the confections, means for mounting said holder in the receptacle, a comminuted food hopper adapted to discharge through its bottom, means supporting the hopper for movement to and from a position across the top of the receptacle, a movable closure device mounted in the receptacle, and means actuated by the movement of the hopper to a position across the top of the receptacle to shift the closure toward the holder for closing space between the holder and the wall of the receptacle, whereby the comminuted material discharged from the hopper will be retained on the holder and embed said articles.

9. Confection making apparatus comprising a receptacle, a portable holder having means for supporting a plurality of articles side by side and adapted to support comminuted material in spaces surrounding the confections, means for mounting said holder in the receptacle, a comminuted food hopper adapted to discharge through its bottom, means supporting the hopper for movement to and from a position across the top of the receptacle, a closure pivoted on the receptacle and extending into the interior of the latter, and means for swinging the closure to a position adjacent one edge of a holder supported in the receptacle to prevent food particles released onto mounted articles from moving off said edge of the holder, whereby the comminuted material discharged from the hopper will be retained on the holder and embed said articles.

10. Confection making apparatus comprising a receptacle, a portable holder having means for supporting a plurality of articles side by side and adapted to support comminuted material in spaces surrounding the confections, means for mounting said holder in the receptacle, a comminuted food hopper adapted to discharge through its bottom, means supporting the hopper for movement to and from a position across the top of the receptacle, a closure pivoted on the receptacle and extending into the interior of the latter, and means actuated by the movement of the hopper to said position for swinging the closure to a position adjacent one edge of a holder supported in the receptacle to prevent food particles released onto mounted articles from moving off said edge of the holder, whereby the comminuted material discharged from the hopper will be retained on the holder and embed said articles.

11. Confection making apparatus comprising a receptacle, a portable holder having means for supporting a plurality of articles side by side and adapted to support comminuted material in spaces surrounding the confections, means for mounting said holder in the receptacle, a comminuted food hopper and means for supporting the same across the top of the receptacle, a movable closure device mounted in the receptacle, and means actuable to shift the closure toward the holder for closing space between the holder and the wall of the receptacle, whereby the comminuted material discharged from the hopper will be retained on the holder and embed said articles.

12. Confection making apparatus comprising a receptacle, a portable holder having means for supporting a plurality of articles side by side and adapted to support comminuted material in spaces surrounding the confections, means for mounting said holder in the receptacle, a comminuted food hopper and means for supporting the same across the top of the receptacle, a closure pivoted on the receptacle and extending into the interior of the latter, and means for swinging the closure to a position adjacent one edge of a holder supported in the receptacle to prevent food particles released onto mounted articles from moving off said edge of the holder.

CARL R. TAYLOR.